United States Patent
Takeuchi

(10) Patent No.: US 8,436,606 B2
(45) Date of Patent: May 7, 2013

(54) ROTATION DETECTOR

(75) Inventor: Shuichi Takeuchi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 297 days.

(21) Appl. No.: 12/883,144

(22) Filed: Sep. 15, 2010

(65) Prior Publication Data

US 2011/0084691 A1 Apr. 14, 2011

(30) Foreign Application Priority Data

Oct. 13, 2009 (JP) ................................. 2009-236248

(51) Int. Cl.
*G01B 7/30* (2006.01)
(52) U.S. Cl.
USPC ............ 324/207.25; 324/207.11; 324/207.21; 324/207.23; 324/173; 324/166; 356/602; 338/32 R; 338/32 H
(58) Field of Classification Search ............. 324/207.11, 324/207.21, 207.23, 207.25, 173, 166; 356/602, 356/601; 338/32 R, 32 H
See application file for complete search history.

(56) References Cited

U.S. PATENT DOCUMENTS

| | | | |
|---|---|---|---|
| 5,136,522 A * | 8/1992 | Loehrke | 700/164 |
| 7,119,539 B2 * | 10/2006 | Butzmann | 324/252 |
| 2002/0020070 A1 * | 2/2002 | Takeuchi | 33/1 PT |
| 2002/0130657 A1 * | 9/2002 | Li | 324/207.21 |
| 2002/0175673 A1 * | 11/2002 | Butzmann | 324/174 |
| 2009/0058404 A1 * | 3/2009 | Kurumado | 324/207.25 |
| 2009/0153137 A1 * | 6/2009 | Bailey et al. | 324/207.25 |
| 2009/0315543 A1 * | 12/2009 | Guo et al. | 324/207.21 |

FOREIGN PATENT DOCUMENTS

JP 2004-264137 A 9/2004

* cited by examiner

*Primary Examiner* — Huy Q Phan
*Assistant Examiner* — Thang Le
(74) *Attorney, Agent, or Firm* — Roberts Mlotkowski Safran & Cole P.C.

(57) ABSTRACT

A rotation detector includes a first distance sensor disposed to face a rotating body with a gear portion formed non-parallel to a rotation axis for continuously measuring a distance from the gear portion during rotation of the rotating body, a second distance sensor disposed at a position different from the first distance sensor in a direction of the rotation axis for continuously measuring a distance from the gear portion during rotation of the rotating body, and an axis shift detecting portion for detecting an axis shift of the rotation axis based on a variation in the distance measured by at least one of the first and second distance sensors.

8 Claims, 11 Drawing Sheets

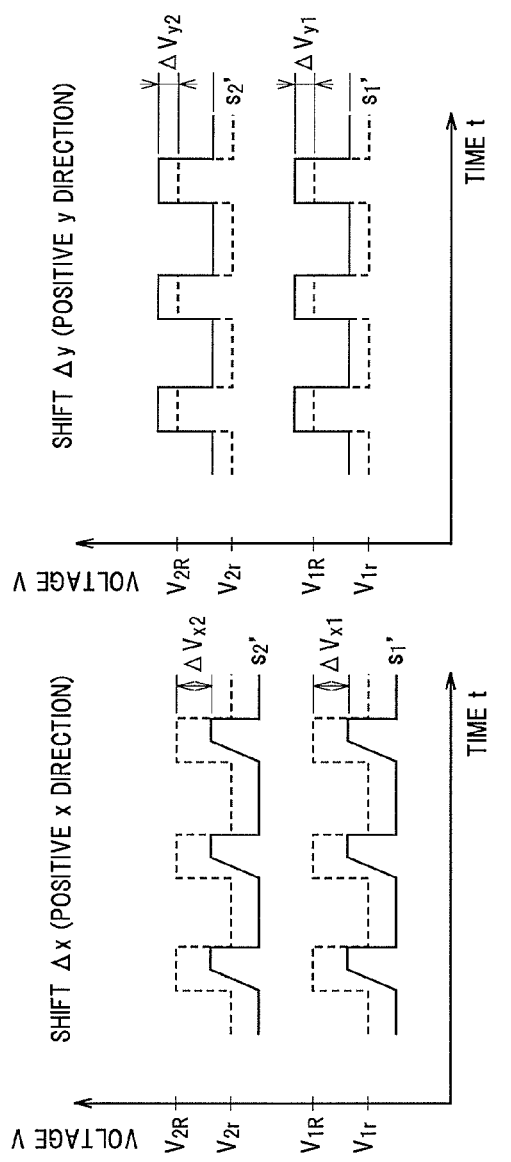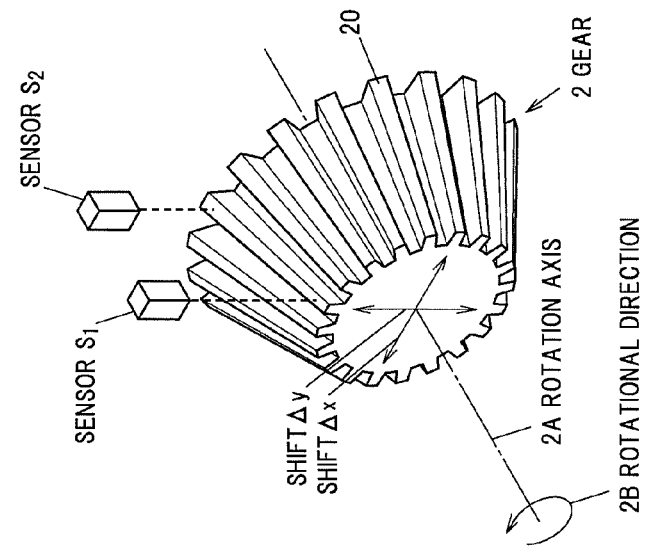

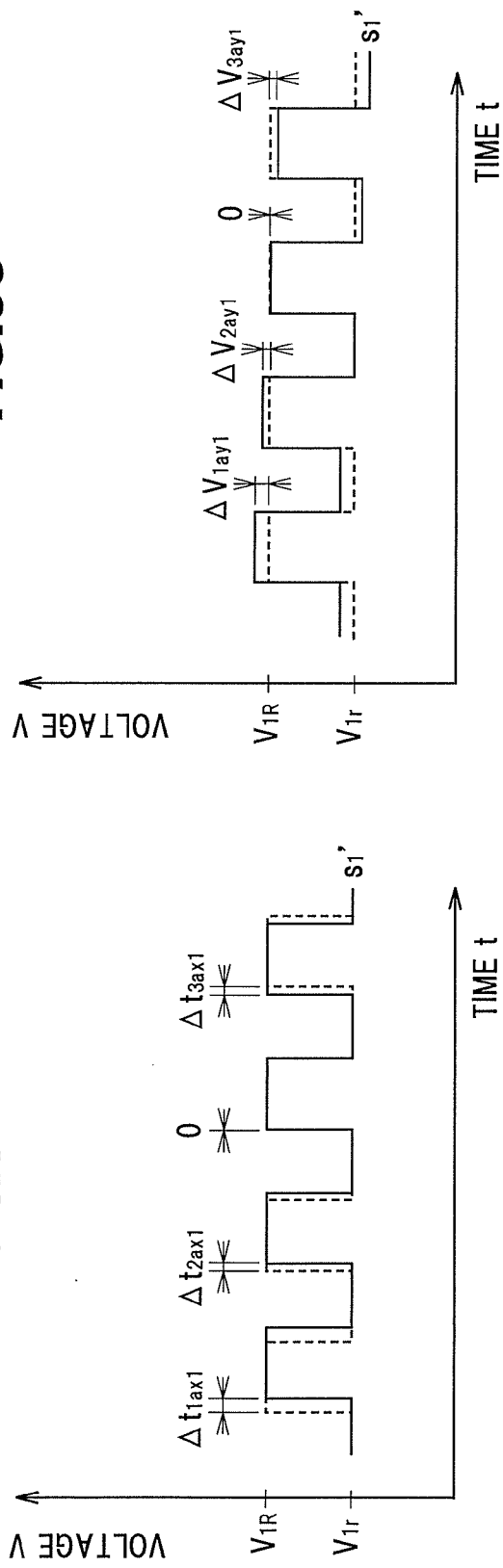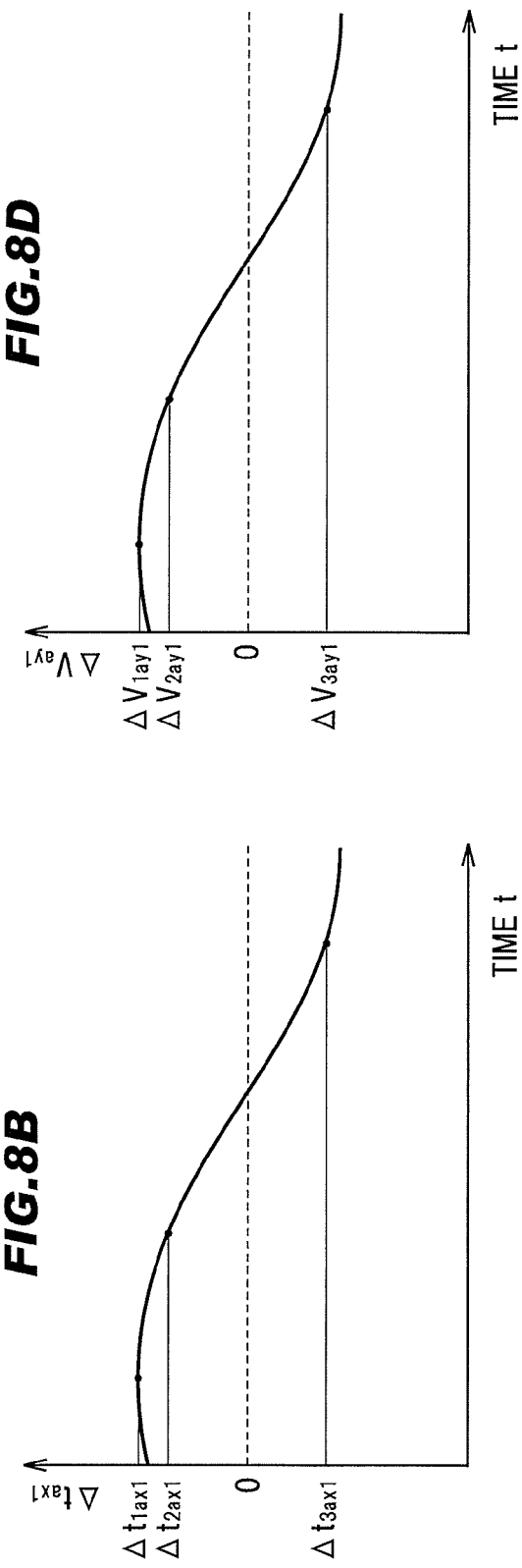

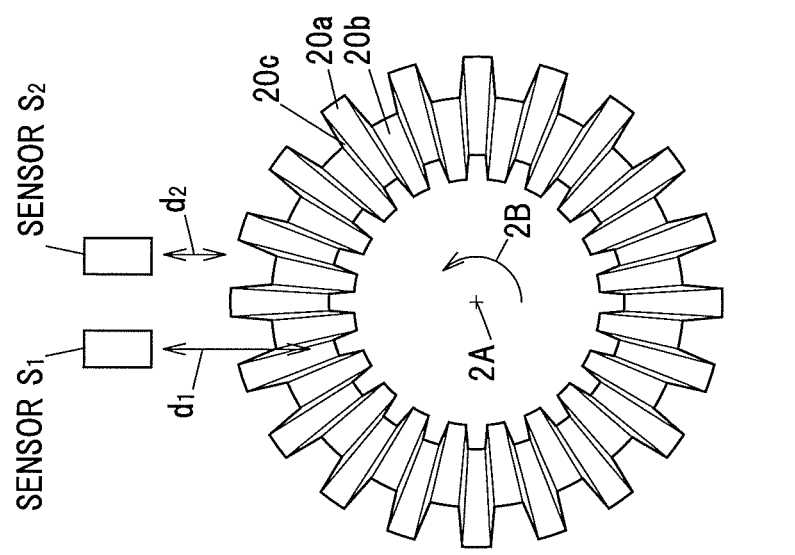
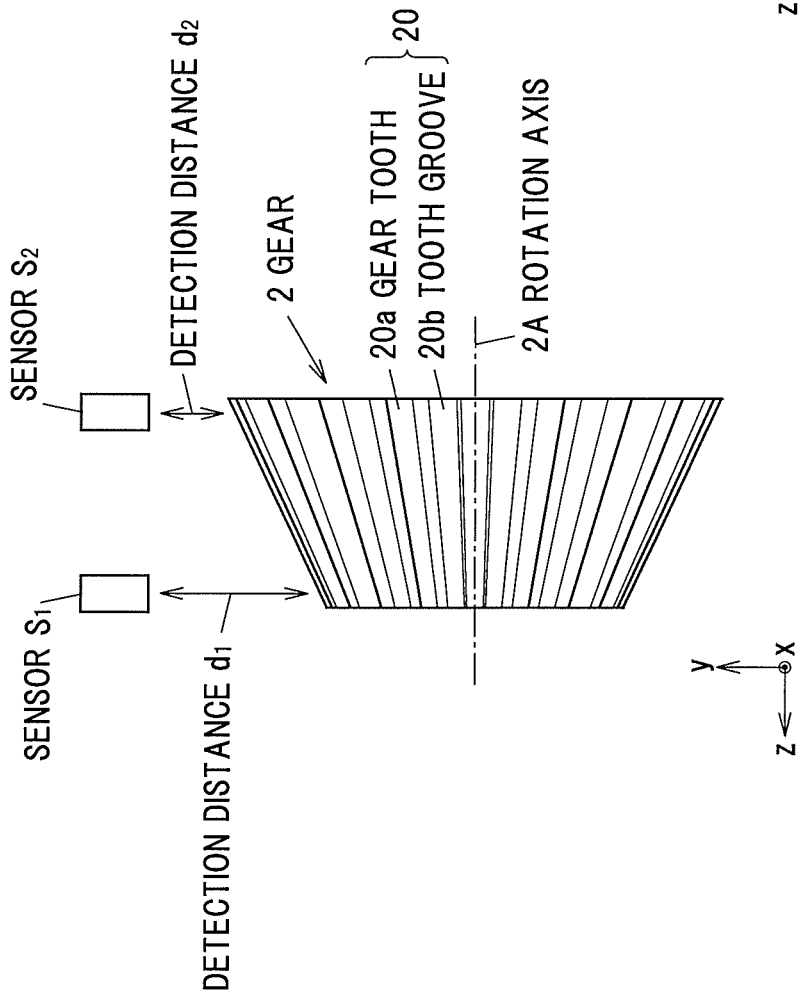

ROTATION DETECTOR

The present application is based on Japanese Patent Application No. 2009-236248 filed on Oct. 13, 2009, the entire contents of which are incorporated herein by reference.

BACKGROUND OF THE INVENTION

1. Field of the Invention

The invention relates to a rotation detector.

2. Description of the Related Art

A conventional rotation detector, which can accurately measure a rotation angle even in case of occurrence of axis shift, is known (e.g., see JP-A-2004-264137).

The rotation detector described in JP-A-2004-264137 includes a magnetic sensor for detecting a magnetic field which is generated by a disc-shaped magnet connected to a rotation axis, a storage portion for storing an output value outputted from the magnetic sensor, and an arithmetic portion for deriving a rotation angle of the rotation axis based on the output value outputted from the magnetic sensor. By the arithmetic portion, each rotation angle obtained by producing a first axis shift in the rotation axis and rotating it, which is outputted from the magnetic sensor, is stored as a data 1 in the storage portion, each rotation angle obtained by producing a second axis shift in the rotation axis and rotating it, which is outputted from the magnetic sensor, is stored as a data 2 in the storage portion, and corrected values of phase and amplitude are determined based on the data 1 and the data 2. This enables to determine the corrected value of the output value outputted from the magnetic sensor at the time of rotating the rotation axis.

However, according to the above-mentioned conventional rotation detector, there is a problem that only the corrected value of the output value from the magnetic sensor used for deriving the rotation angle is determined and it is not possible to detect how the axis shift with respect to the rotation axis occurs.

SUMMARY OF THE INVENTION

Therefore, it is an object of the invention to provide a rotation detector that can detect axis shift occurred in a rotation axis, thereby detecting the accurate rotation of the rotation axis in accordance with the detected axis shift.

(1) According to one embodiment of the invention, a rotation detector comprises:

a first distance sensor disposed to face a rotating body with a gear portion formed non-parallel to a rotation axis for continuously measuring a distance from the gear portion during rotation of the rotating body;

a second distance sensor disposed at a position different from the first distance sensor in a direction of the rotation axis for continuously measuring a distance from the gear portion during rotation of the rotating body; and an axis shift detecting portion for detecting an axis shift of the rotation axis based on a variation in the distance measured by at least one of the first and second distance sensors.

According to the above embodiment (1), since the first and second distance sensors respectively measure distances from a non-parallel gear portion, it is possible to detect the axis shift occurred in the rotation axis based on variation in the measured distances and to detect the accurate rotation of the rotation axis in accordance with the detected axis shift.

In the above embodiment (1) of the invention, the following modifications and changes can be made.

(i) The axis shift detecting portion detects the shift of the rotation axis based on an increase, a decrease or a combination thereof in the distance measured by at least one of the first and second distance sensors.

(ii) The axis shift detecting portion detects the shift of the rotation axis based on a difference of timing to measure the distance that is measured by at least one of the first and second distance sensors.

(iii) The rotation detector further comprises:

a rotation detecting portion for correcting the distance measured by the first or second distance sensor based on the shift of the rotation axis detected by the axis shift detecting portion and detecting the number of revolutions of the gear portion.

(iv) The rotation detector further comprises:

an abnormal condition detecting portion for detecting an abnormal condition of the rotating body based on the shift of the rotation axis detected by the axis shift detecting portion.

(v) The first and second distance sensors are disposed at positions to provide the same argument on an x-y plane centered around the rotation axis.

(vi) The first and second distance sensors are disposed at positions to provide different arguments on an x-y plane centered around the rotation axis.

(vii) The first and second distance sensors are disposed directly above end portions of the gear portion in the direction of the rotation axis.

(viii) The first and second distance sensors are disposed directly above portions other than above the end portions of the gear portion in the direction of the rotation axis.

(ix) The first and second distance sensors comprise a magnetic or optical distance sensor.

EFFECTS OF THE INVENTION

According to the invention, a rotation detector can detect axis shift occurred in a rotation axis, thereby detecting the accurate rotation of the rotation axis in accordance with the detected axis shift.

BRIEF DESCRIPTION OF THE DRAWINGS

Next, the present invention will be explained in more detail in conjunction with appended drawings, wherein:

FIGS. 3A and 3B are schematic views showing a configuration example of a gear, wherein FIG. 3A is a side view and FIG. 3B is a front view;

FIGS. 5A to 5C are schematic views showing an operation when axis shift occurs in a gear, wherein FIG. 5A is a schematic view showing an example when the axis shift occurs in the gear and FIGS. 5B and 5C are graphs showing examples of detection signals detected by the rotation detector;

FIGS. 6A and 6B are schematic views showing an operation when position shift occurs in a gear, wherein FIG. 6A is a schematic view showing an example when the position shift occurs in the gear and FIG. 6B is a graph showing an example of detection signals detected by the rotation detector;

FIGS. 7A to 7C are schematic views showing an operation when axis distortion occurs in a gear, wherein FIG. 7A is a schematic view showing an example when the axis distortion occurs in the gear and FIGS. 7B and 7C are graphs showing examples of detection signals detected by the rotation detector;

FIGS. 8A to 8D are graphs showing examples of detection signals detected by the rotation detector when an amount of axis distortion of the gear varies with time;

FIGS. 10A and 10B are schematic views showing a configuration example of a gear in a second embodiment, wherein FIG. 10A is a side view and FIG. 10B is a front view; and FIGS. 11A and 11B are schematic views showing an operation when axis shift occurs in a gear, wherein FIG. 11A is a schematic view showing an example when the axis shift occurs in the gear and FIG. 11B is a graph showing an example of detection signals detected by the rotation detector.

DETAILED DESCRIPTION OF THE PREFERRED EMBODIMENTS

First Embodiment

Structure of Rotation Detector

Figure 1:
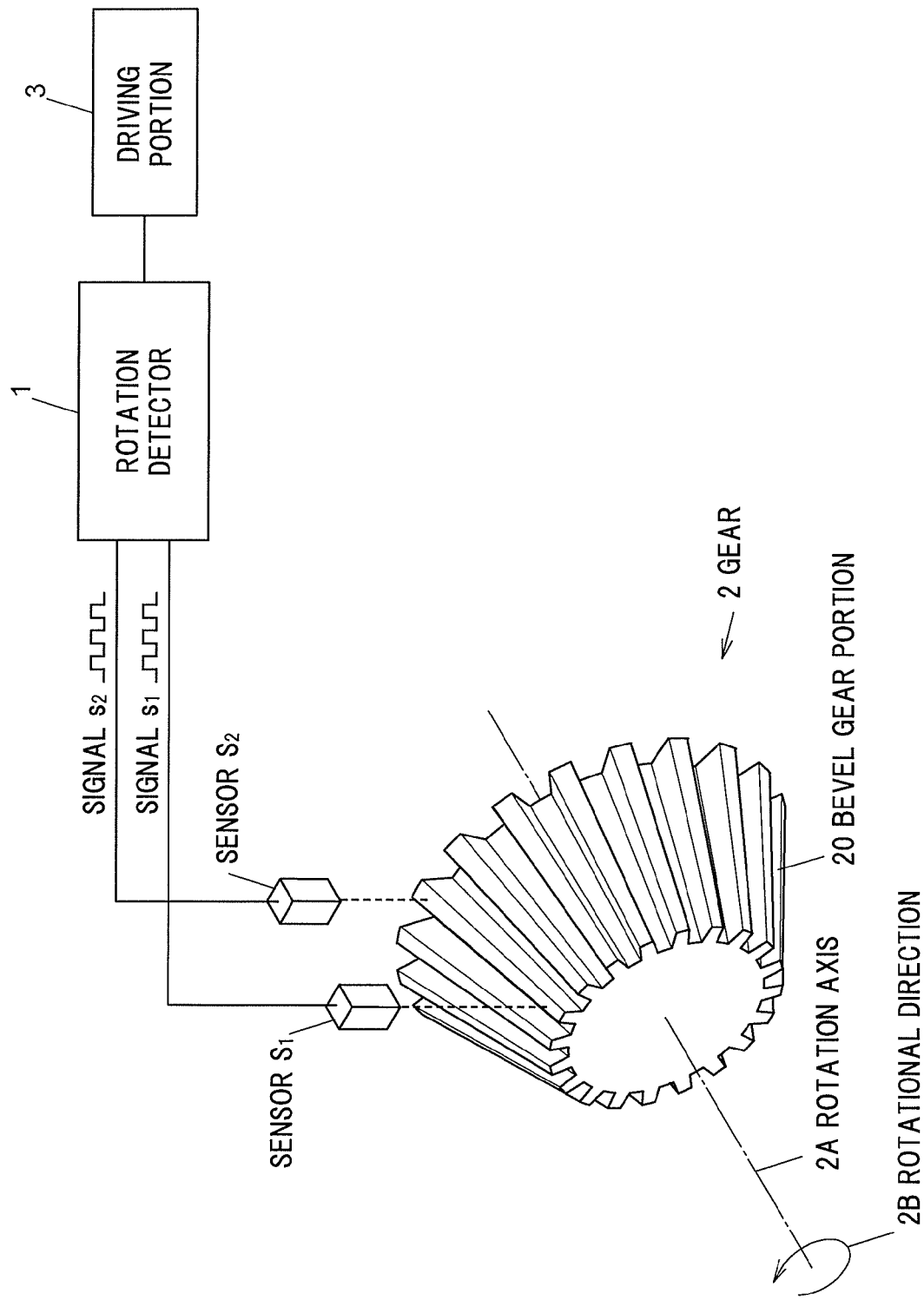
FIG. 1 is a schematic view showing a configuration example of outer appearance of a rotation detector in a first embodiment of the present invention.

FIG. 1 is a schematic view showing a configuration example of outer appearance of a rotation detector in a first embodiment of the invention.

A rotation detector 1 has sensors $S_1$ and $S_2$ for measuring distances from a bevel gear portion 20 of a gear 2 and outputting a voltage value in accordance with the distances, and an internal circuit for detecting the number of revolutions of the gear 2 or shift of a rotation axis, etc., based on the distance measured by the sensors $S_1$ and $S_2$. Meanwhile, the rotation detector 1 is connected to a driving portion 3 and outputs the detected number of revolutions, etc., for feedback.

The sensors $S_1$ and $S_2$ are a magnetic or optical distance sensor, and output, e.g., a small voltage value when the distance is large and a large voltage value when the distance is small.

The gear 2 has the bevel gear portion 20 on a side surface which rotates, is connected to non-illustrated other gears, etc., and rotates in a rotational direction 2B about a rotation axis 2A.

The driving portion 3 is a drive unit such as a motor or a engine, is connected to a rotating shaft of the gear 2 directly or indirectly through another gear which is connected to the gear 2, and drives the gear 2 based on information outputted from the rotation detector 1.

Figure 2:
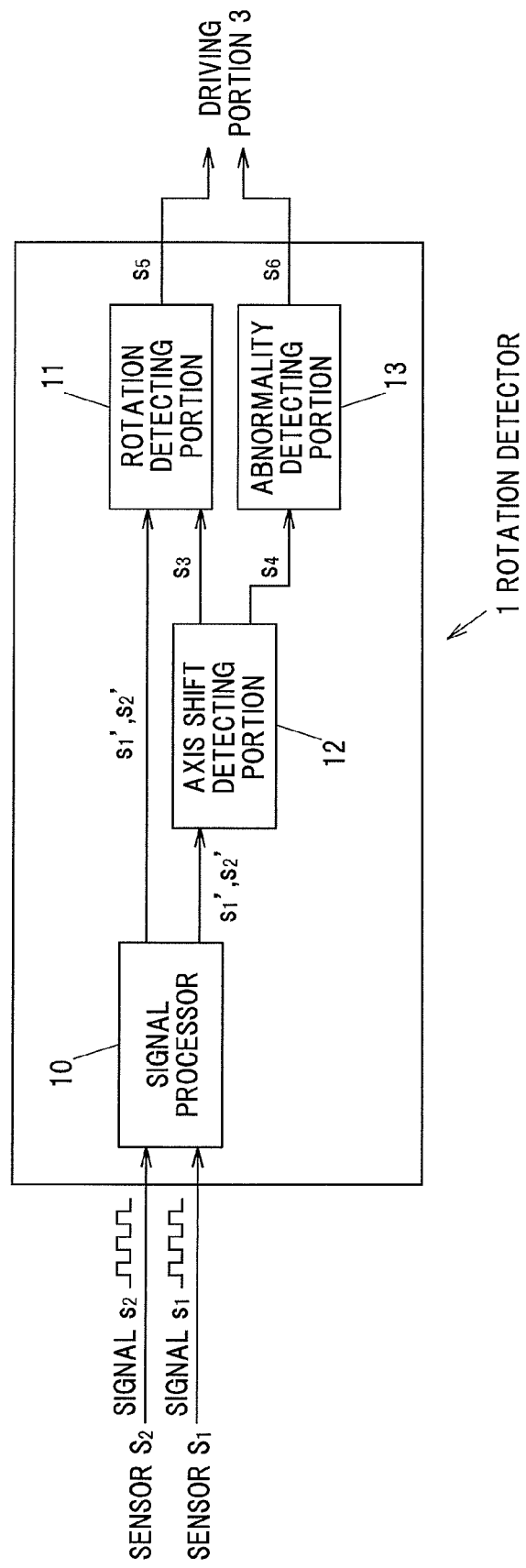
FIG. 2 is a block diagram showing a configuration example of the rotation detector.

FIG. 2 is a block diagram showing a configuration example of the rotation detector 1.

A signal processor 10, a rotation detecting portion 11, an axis shift detecting portion 12 and an abnormality detecting portion 13 are included as an internal circuit in the rotation detector 1.

The signal processor 10 receives signals $s_1$ and $s_2$ outputted from the sensors $S_1$ and $S_2$, and outputs signals $s_1'$ and $s_2'$ after performing signal amplification or noise removal, etc.

The rotation detecting portion 11 detects the number of revolutions of the gear 2 based on the signals $s_1'$ and $s_2'$, and outputs a signal $s_5$ in accordance with the detected number of revolutions to the driving portion 3. In addition, when a signal $s_3$ related to below-described axis shift is received, the rotation detecting portion 11 corrects the signals $s_1'$ and $s_2'$ based on the signal $s_3$ and detects the number of revolutions of the gear 2 more accurately.

The axis shift detecting portion 12 detects axis shift of the rotation axis of the gear 2 based on variation in at least one of the signals $s_1'$ and $s_2'$, and outputs signals $s_3$ and $s_4$ in accordance with the axis shift.

The abnormality detecting portion 13 detects occurrence of abnormal condition in the gear 2 in case of occurrence of the axis shift more than a threshold value preliminarily determined based on the signal $s_4$ outputted from the axis shift detecting portion 12, and outputs a signal $s_6$ to inform such occurrence to the driving portion 3. The driving portion 3 may be configured to stop the driving thereof when the abnormality is detected by receiving the signal $s_6$.

Figure 3A:
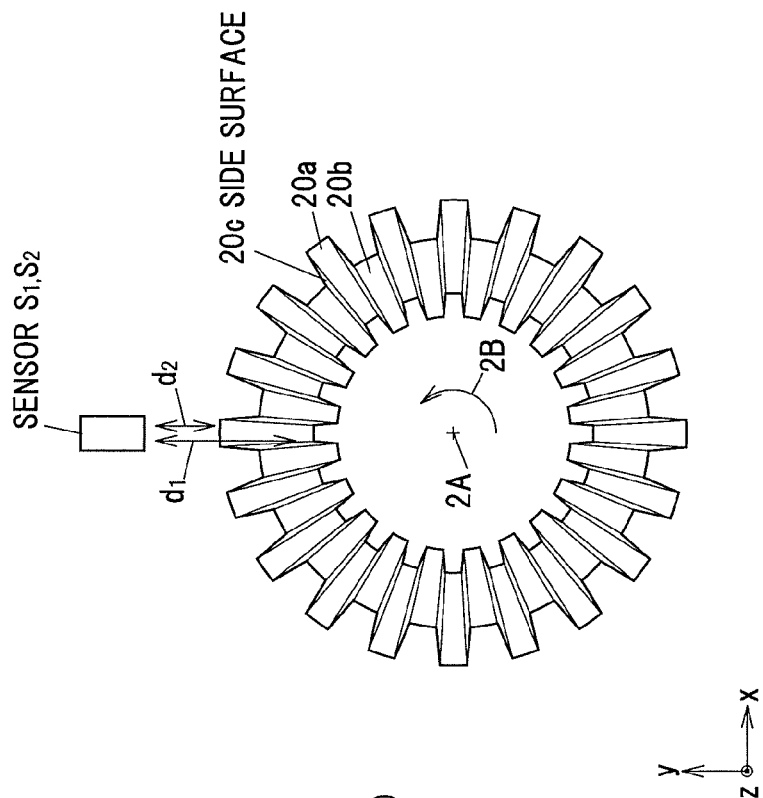
Figure 3B:
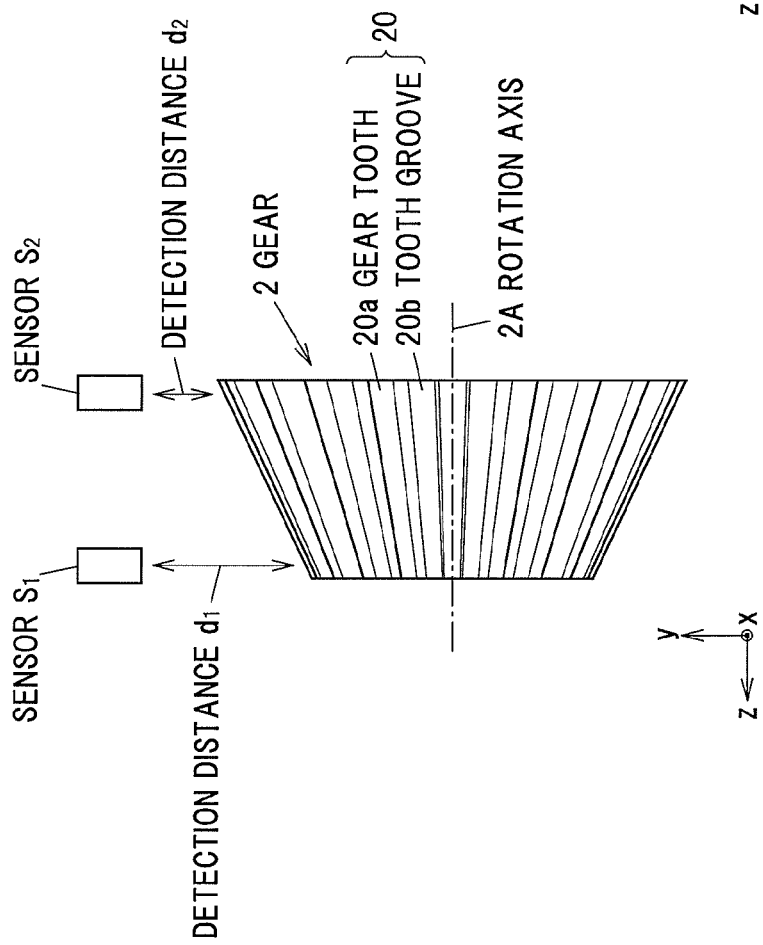

FIGS. 3A and 3B are schematic views showing a configuration example of a gear, wherein FIG. 3A is a side view and FIG. 3B is a front view.

The gear 2 has the bevel gear portion 20 composed of gear teeth 20a and tooth grooves 20b which are non-parallel to the rotation axis 2A. Although the rectangular-shaped gear tooth 20a and tooth groove 20b will be described as an example, it is not limited thereto and a general tooth form such as an involute tooth form may be used.

The sensor $S_1$ is placed above the left end of the bevel gear portion 20 in the drawing to measure a distance $d_1$ from the bevel gear portion 20. Meanwhile, the sensor $S_2$ is placed above the right end of the bevel gear portion 20 in the drawing to measure a distance $d_2$ from the bevel gear portion 20. The sensors $S_1$ and $S_2$ are arranged at positions having the same argument on an x-y plane (i.e., an azimuth angle from an x-axis of the x-y plane in the polar coordinate system) centered around the rotation axis 2A.

Operation of the Rotation Detector

An example operation of the rotation detector in an embodiment of the invention will be described below in reference to each drawing.

(1) Basic Operation of the Rotation Detector

Firstly, when the driving portion 3 is powered on, the driving portion 3 drives the gear 2 by applying the power. The gear 2 starts rotating by being driven by the driving portion 3.

Meanwhile, the sensors $S_1$ and $S_2$ measure the distances $d_1$ and $d_2$ from the bevel gear portion 20 of the gear 2 which is rotating, and outputs the signals $s_1$ and $s_2$ corresponding to the measurement.

The signal processor 10 of the rotation detector 1 amplifies the signals $s_1$ and $s_2$, removes noise, etc., and outputs the signals $s_1'$ and $s_2'$ to the rotation detecting portion 11 and the axis shift detecting portion 12.

Figure 4:
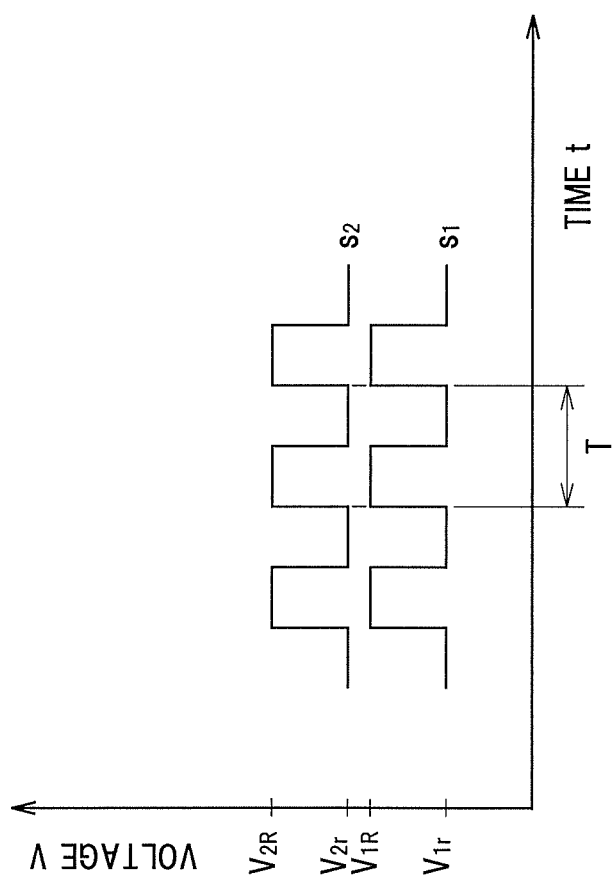
FIG. 4 is a graph showing an example of detection signals detected by the rotation detector.

FIG. 4 is a graph showing an example of detection signal detected by the rotation detector 1.

The signals $s_1$ and $s_2$ to be input to the signal processor 10 are rectangular signals corresponding to the shapes of the gear tooth 20a and the tooth groove 20b which pass under the sensors $S_1$ and $S_2$. Note that, the voltage value when the tooth 20a passes under the sensor $S_1$ is defined as $V_{1R}$ and the voltage value when the tooth groove 20b passes thereunder is defined as $V_{1r}$, and in the same manner, the voltage value when the tooth 20a passes under the sensor $S_2$ is defined as $V_{2R}$ and the voltage value when the tooth groove 20b passes thereunder is defined as $V_{2r}$. That is, the signals $s_1$ and $s_2$ are large when the distances $d_1$ and $d_2$ are small, and the signals $s_1$ and $s_2$ are small when the distances $d_1$ and $d_2$ are large.

In addition, a cycle T between rectangular signals which is multiplied by the number of teeth is a rotational period of the gear 2. The rotation detecting portion 11 detects the number of revolutions of the gear 2 in accordance with the cycle T. A waveform of the signals $s_1'$ and $s_2'$ which are output from the signal processor 10 is that of the signals $s_1$ and $s_2$ multiplied by a constant, which has thus a similar FIGURE.

(2-1) Operation in the Case that the Axis Shift Occurs in the Gear

FIGS. 5A to 5C are schematic views showing an operation when axis shift occurs in a gear, wherein FIG. 5A is a schematic view showing an example when the axis shift occurs in the gear and FIGS. 5B and 5C are graphs showing examples of detection signals detected by the rotation detector 1.

FIG. 5B shows the signals $s_1$ and $s_2$ detected by the rotation detector 1 when the rotation axis 2A of the gear 2 is shifted $\Delta_x$ in parallel in a positive x-direction as shown in FIG. 5A, and FIG. 5C shows the case where the rotation axis 2A of the gear 2 is shifted $\Delta_y$ in parallel in a positive y-direction.

When the rotation axis 2A of the gear 2 is shifted $\Delta_x$ in parallel in the positive x-direction, the distances between the sensors $S_1$, $S_2$ and the bevel gear portion 20 become large, thus, the values of the signals $s_1'$ and $s_2'$ to be input to the signal processor 10 are $\Delta V_{x1}$ and $\Delta V_{x2}$ respectively smaller than the case where the $\Delta_x$ is 0 (indicated by a dashed line). In addition, since distances to be measured are between the sensors $S_1$, $S_2$ and a side surface 20c of the bevel gear portion 20, the rise of the rectangular shape is gradual.

Meanwhile, in case of shifting $\Delta_x$ in a negative x-direction, the signals $s_1'$ and $s_2'$ are $\Delta V_{x1}$ and $\Delta V_{x2}$ respectively smaller than the case where the $\Delta_x$ is 0 (indicated by a dashed line) in the same manner, however, there is no change in the rise of the rectangular shape but the fall thereof is gradual.

When the rotation axis 2A of the gear 2 is shifted $\Delta_y$ in parallel in a positive y-direction, the distances between the sensors $S_1$, $S_2$ and the bevel gear portion 20 become small, thus, the values of the signals $s_1'$ and $s_2'$ to be input to the signal processor 10 are $\Delta V_{y1}$ and $\Delta V_{y2}$ respectively larger than the case where the $\Delta_y$ is 0 (indicated by a dashed line).

Meanwhile, in case of shifting $\Delta_y$ in a negative y-direction, the signals $s_1'$ and $s_2'$ are $\Delta V_{y1}$ and $\Delta V_{y2}$, respectively smaller than the case where the $\Delta_y$ is 0 (indicated by a dashed line).

Figure 6B:
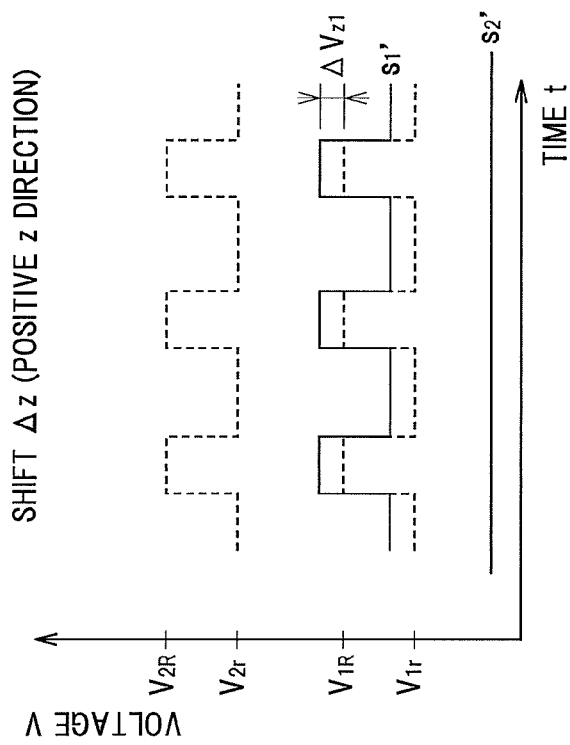
Figure 6A:
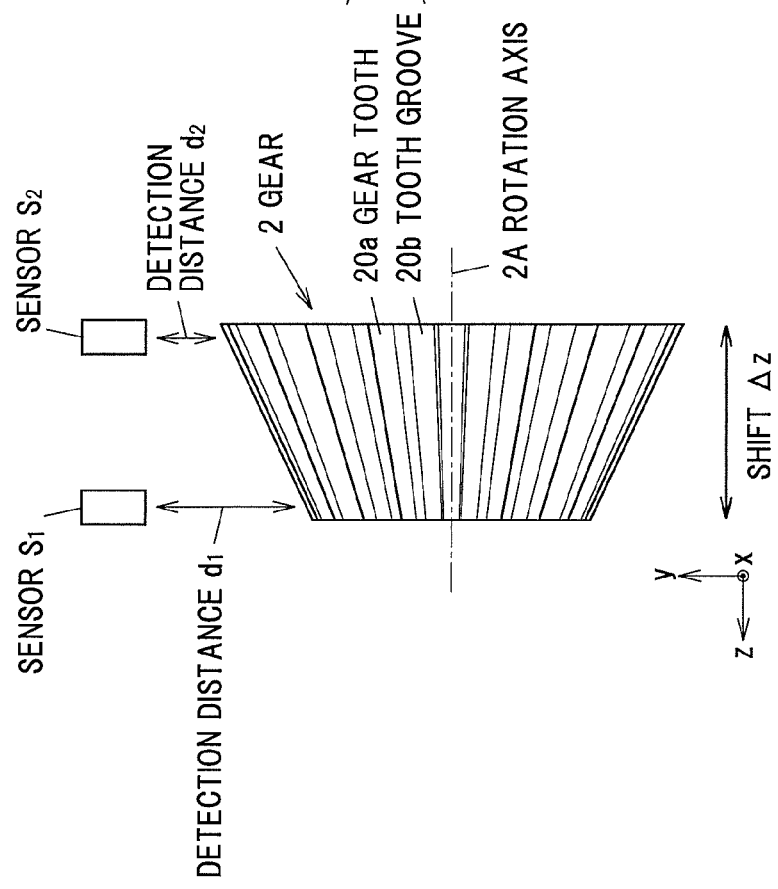

(2-2) Operation in the Case that the Position Shift in an Axis Direction Occurs in the Gear FIGS. 6A and 6B are schematic views showing an operation when position shift occurs in a gear, wherein FIG. 6A is a schematic view showing an example when the position shift occurs in the gear and FIG. 6B is a graph showing an example of detection signals detected by the rotation detector 1.

FIG. 6B shows the signals $s_1'$ and $s_2'$ detected by the rotation detector 1 when the gear 2 is shifted $\Delta_z$ parallel to the rotation axis 2A in a positive z-direction as shown in FIG. 6A.

When the gear 2 is shifted $\Delta_x$ parallel to the rotation axis 2A in the positive z-direction, the distance between the sensor $S_1$ and the bevel gear portion 20 becomes small, thus, the value of the signal $s_1'$ to be input to the signal processor 10 is $\Delta V_{z1}$ larger than the case where the $\Delta_z$ is 0 (indicated by a dashed line). In addition, since the sensor $S_2$ goes beyond the area of the gear tooth 20a, the signal $s_2'$ is small value and not in a non-rectangular shape.

Meanwhile, in case of shifting $\Delta_x$ in a negative z-direction, the signal $s_2'$ is $\Delta V_{x2}$ smaller than the case where the $\Delta_x$ is 0 (indicated by a dashed line) in the same manner, and signal $s_1'$ is small value and not in a non-rectangular shape.

(2-3) Operation in the Case that the Axis Distortion Occurs in the Gear

Figure 7C:
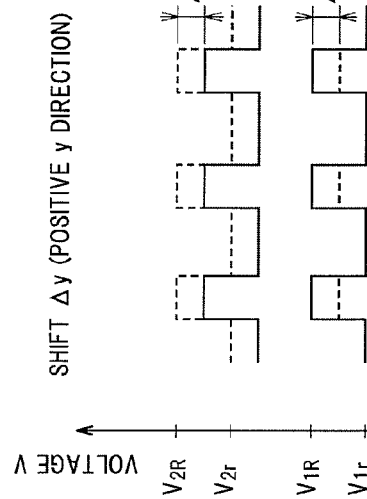
Figure 7B:
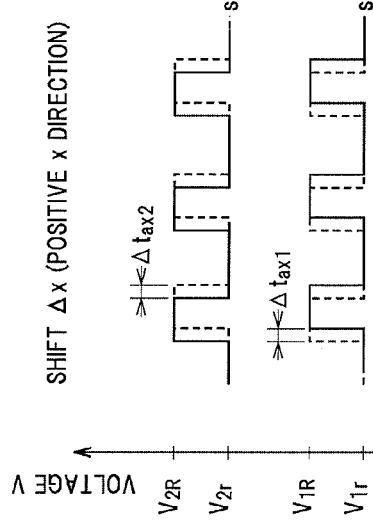
Figure 7A:
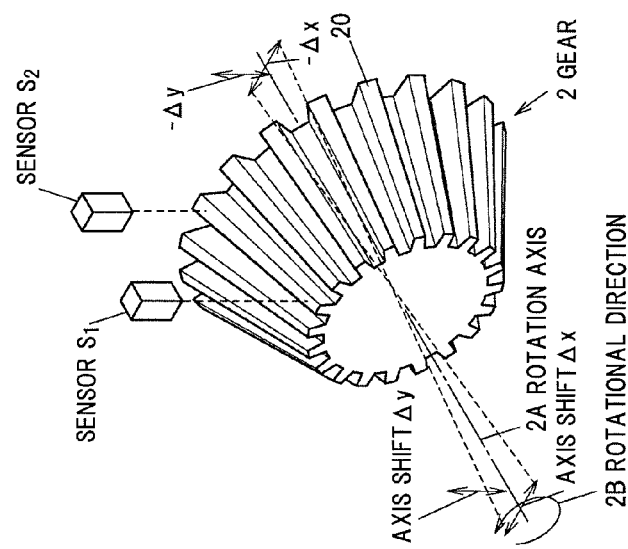

FIGS. 7A to 7C are schematic views showing an operation when axis distortion occurs in a gear, wherein FIG. 7A is a schematic view showing an example when the axis distortion occurs in the gear and FIGS. 7B and 7C are graphs showing examples of detection signals detected by the rotation detector 1.

FIG. 7B shows the signals $s_1'$ and $s_2'$ detected by the rotation detector 1 when the rotation axis 2A of the gear 2 is twisted (or shifted) $\Delta_x$ in an x-direction as shown in FIG. 7A, and FIG. 7C shows the signals $s_1'$ and $s_2'$ when the rotation axis 2A of the gear 2 is shifted $\Delta_y$ in parallel in a y-direction.

When the rotation axis 2A of the gear 2 is shifted $\Delta_x$ in the x-direction, a line connecting the sensor $S_1$ to the sensor $S_2$ is non-parallel to the rotation axis 2A of the bevel gear portion 20, thus, timings to make rectangular shapes of the signals $s_1'$ and $s_2'$ to be input to the signal processor 10 are respectively shifted in positive and negative directions of Time t as compared with the case where the $\Delta_x$ is 0 (indicated by a dashed line), and differences $\Delta_{tax1}$ and $\Delta_{tax2}$ are generated.

Meanwhile, in case of shifting $\Delta_x$ in the negative x-direction, timings to make the rectangular shapes of the signals $s_1'$ and $s_2'$ are respectively shifted in the negative and positive directions of Time t as compared with the case where the $\Delta_x$ is 0 (indicated by a dashed line), and differences $\Delta_{tax1}$ and $\Delta_{tax2}$ are generated in the same manner.

When the rotation axis 2A of the gear 2 is shifted $\Delta_y$ in the y-direction, a line connecting the sensor $S_1$ to the sensor $S_2$ is non-parallel to the rotation axis 2A of the bevel gear portion 20 and a distance between the sensor $S_1$ and the bevel gear portion 20 becomes large, thus, the values of the signal $s_1'$ to be input to the signal processor 10 is $\Delta V_{ay1}$ larger than the case where the $\Delta_y$ is 0 (indicated by a dashed line). Meanwhile, since the distance between the sensor $S_2$ and the bevel gear portion 20 becomes small, the values of the signal $s_2'$ to be input to the signal processor 10 is $\Delta V_{ay2}$ smaller than the case where the $\Delta_y$ is 0 (indicated by a dashed line).

Meanwhile, in case of shifting $\Delta_y$ in the negative y-direction, the signal $s_1'$ is $\Delta V_{ay1}$ smaller and the signal $s_2'$ is $\Delta V_{ay2}$ larger than the case where the $\Delta_y$ is 0 (indicated by a dashed line).

FIGS. 8A to 8D are graphs showing examples of detection signals detected by the rotation detector 1 when an amount of axis distortion of the gear 2 varies with time.

When distortion $\Delta_x$ of the axis shown in FIG. 7A varies with time, the generated shift $\Delta_{tax}$ of the timing to make the rectangular shape varies $\Delta_{t1ax1}$, $\Delta_{t2ax1}$, 0, and then, $\Delta_{t3ax1}$ as compared with the case where $\Delta_x$ of the signal $s_1'$ is 0 (indicated by a dashed line) as shown in FIG. 8A.

In addition, since the behavior of $\Delta_{tax1}$ varies as shown in FIG. 8B, finding the cycle thereof allows to find the cycle of the axis distortion.

When distortion $\Delta_y$ of the axis shown in FIG. 7A varies with time, $\Delta V_{ay1}$ of the generated rectangular shape varies $\Delta V_{1ay1}$, $\Delta V_{2ay1}$, 0, and then, $\Delta V_{3ay1}$ as compared with the case where $\Delta_y$ of the signal $s_1'$ is 0 (indicated by a dashed line) as shown in FIG. 8C.

In addition, since the behavior of $\Delta V_{ay1}$ varies as shown in FIG. 8D, finding the cycle thereof allows to find the cycle of the axis distortion.

The axis shift detecting portion 12 detects the amount of axis shift and the axis shift direction based on the above-mentioned variation in the signals $s_1'$ and $s_2'$, and outputs the detection results as the signals $s_3$ and $s_4$ to the rotation detecting portion 11 and the abnormality detecting portion 13, respectively (3) Operation of the Axis Shift Detecting Portion 12

Figure 9:
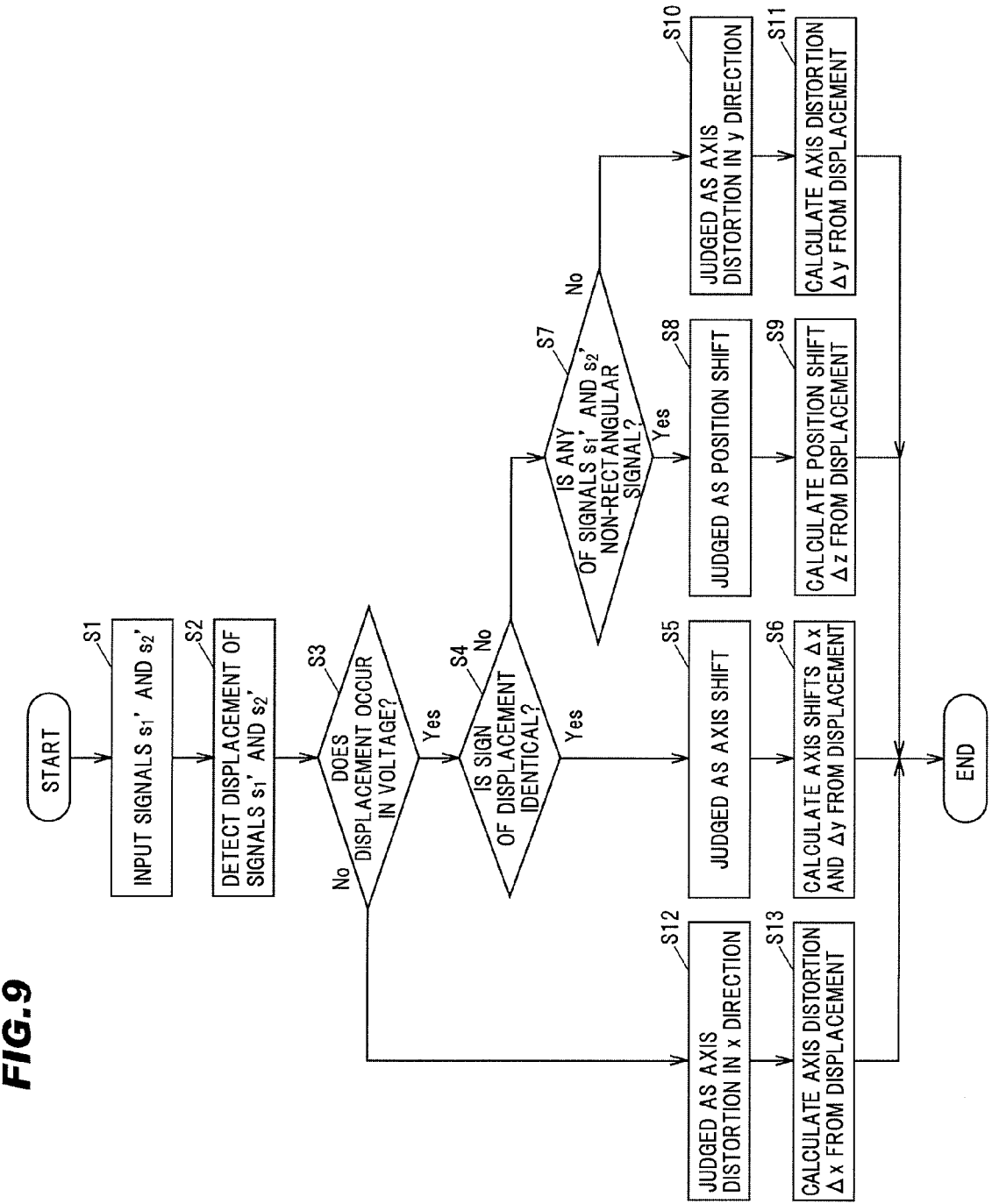
FIG. 9 is a flowchart showing an example of axis-shift judgment operation of the rotation detector.

FIG. 9 is a flowchart showing an example of axis-shift judgment operation of the rotation detector 1.

Firstly, the signals $s_1'$ and $s_2'$ outputted from the signal processor 10 are input to the rotation detecting portion 11 (S1). Then, the rotation detecting portion 11 detects displacement of the signals $s_1'$ and $s_2'$ in the conditions without and with axis shift, e.g., detects $\Delta V_{x1}$ and $\Delta V_{x2}$, $\Delta V_{y1}$ and $\Delta V_{y2}$ shown in FIG. 5, $\Delta v_{z1}$ and $\Delta V_{z2}$ shown in FIG. 6 or $\Delta V_{ay1}$ and $\Delta V_{ay2}$, $\Delta_{tax1}$ and $\Delta_{tax2}$ shown in FIG. 7 (S2).

Next, when the detected displacement is voltage displacement, i.e., in case of other than $\Delta_{tax1}$ and $\Delta_{tax2}$ (Yes for S3), if each sign of displacement of the signals $s_1'$ and $s_2'$ is identical, i.e., if $\Delta V_{x1}$ and $\Delta V_{x2}$ or $\Delta V_{y1}$ and $\Delta V_2$ are the same sign as shown in FIG. 5 (Yes for S4), it is judged as axis shift (S5), the shift is in the x-direction when the rise of the rectangular wave changes as shown in FIG. 5 and is in the y-direction when the change does not occur, and the shift amount $\Delta_x$ or $\Delta_y$ is calculated from the amount of the displacement (S6).

Meanwhile, when the sign of the displacement is not identical in the step S4, i.e., the cases shown in FIGS. 6 and 7 (No for S4) as well as when any of the signals $s_1'$ and $s_2'$ is not rectangular as shown in FIG. 6 (Yes for S7), it is judged as position shift (S8) and the shift amount $\Delta_z$ is calculated from the displacement (S9).

Then, when any of the signals $s_1'$ and $s_2'$ is not rectangular in the step S7 (No for S7), it is judged as axis distortion in a y-direction as shown in FIG. 7 (S10) and the axis distortion $\Delta_y$ is calculated from the displacement (S11).

Then, when the detected displacement is displacement of time in the step S3 (No for S3), it is judged as axis distortion in an x-direction as shown in FIG. 7 (S12) and the axis distortion $\Delta_x$ is calculated from the displacement (S13).

(4) Operation of the Rotation Detecting Portion 11

The rotation detecting portion 11 corrects the received signals $s_1'$ and $s_2'$ based on the signal $s_3$, and calculates the cycle T and the number of revolutions based on the corrected information. In addition, the rotation detecting portion 11 outputs the signal $s_5$ to feed back the calculated number of revolutions to the driving portion 3.

(4) Operation of the Abnormality Detecting Portion 13

When the signal $s_4$ exceeds a predetermined value, the abnormality detecting portion 13 judges that the axis shift is abnormal, and outputs the signal $s_6$ to the driving portion 3 to stop driving the gear 2.

Effects of the First Embodiment

According to the first embodiment, since the axis shift of the gear 2 is detected using a combination of variations in the signals $s_1'$ and $s_2'$ which is different depending on the type of axis shift shown in FIGS. 5 to 8, the axis shift detecting portion 12 can detect the axis shift occurred in the rotation axis by using at least two distance sensors, thereby detecting the accurate rotation of the rotation axis in accordance with the detected axis shift.

Second Embodiment

The second embodiment is different from the first embodiment in that the sensors $S_1$ and $S_2$ are arranged at positions having different arguments on an x-y plane centered around the rotation axis 2A.

FIGS. 10A and 10B are schematic views showing a configuration example of the gear 2 in the second embodiment, wherein FIG. 10A is a side view and FIG. 10B is a front view.

The sensor $S_1$ is placed above the left end of the bevel gear portion 20 in the drawing to measure the distance $d_1$ from the bevel gear portion 20. Meanwhile, the sensor $S_2$ is placed above the right end of the bevel gear portion 20 in the drawing to measure the distance $d_2$ from the bevel gear portion 20. The sensors $S_1$ and $S_2$ are arranged at positions of which arguments on the x-y plane centered around the rotation axis 2A deviate from each other.

Figure 11B:
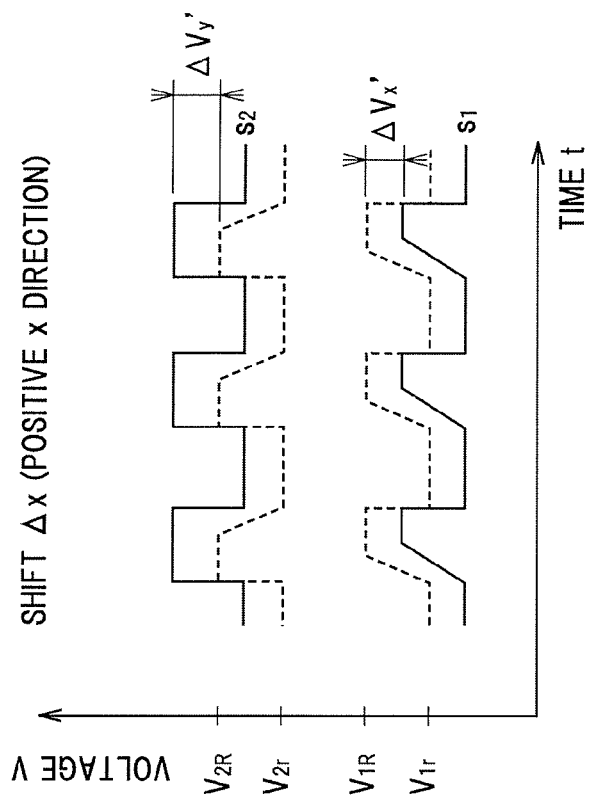
Figure 11A:
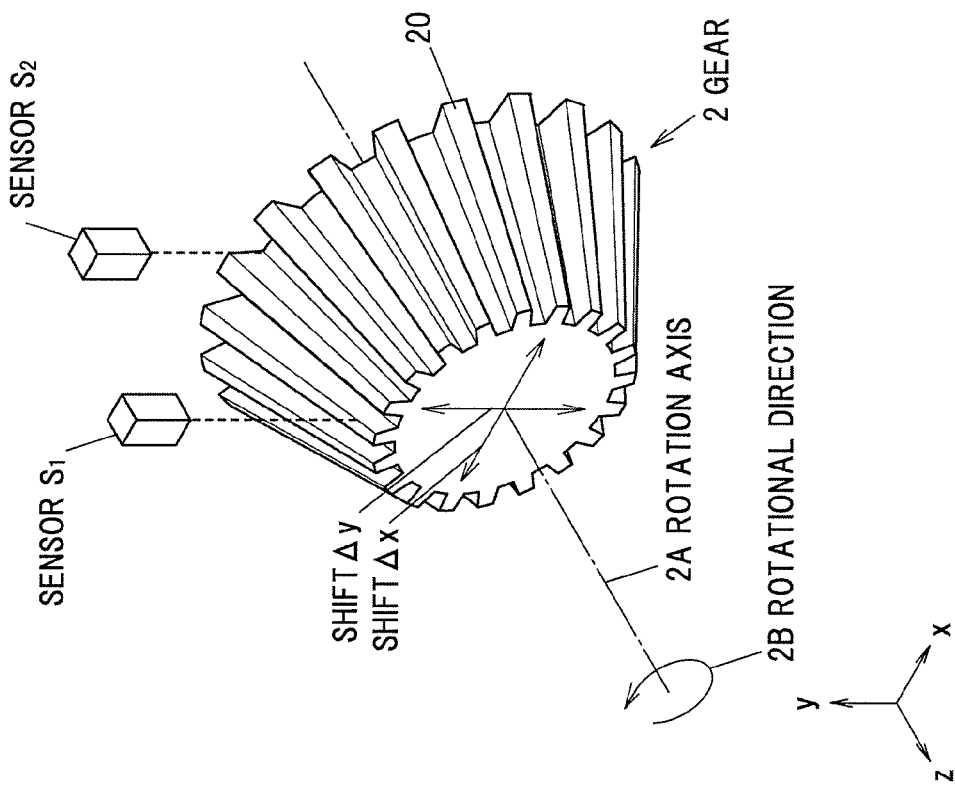

FIGS. 11A and 11B are schematic views showing an operation when axis shift occurs in a gear 2, wherein FIG. 11A is a schematic view showing an example when the axis shift occurs in the gear 2 and FIG. 11B is a graph showing an example of detection signals detected by the rotation detector 1.

FIG. 11B shows the signals $s_1$ and $s_2$ detected by the rotation detector 1 when the rotation axis 2A of the gear 2 is shifted $\Delta_x$ in parallel in the positive x-direction.

When the rotation axis 2A of the gear 2 is shifted $\Delta_x$ in parallel in the positive x-direction, the distance between the sensor $S_1$ and the bevel gear portion 20 becomes large, thus, the value of the signal $s_1$ to be input to the signal processor 10 is $\Delta V_{x1}$ smaller than the case where the $\Delta_x$ is 0 (indicated by a dashed line). In addition, since distances between the sensor $S_1$ and the side surface 20c of the bevel gear portion 20 are measured more often, the rise of the rectangular shape is further gradual.

Meanwhile, since the distance between the sensor $S_2$ and the bevel gear portion 20 becomes small, the value of the signal $s_2$ to be input to the signal processor 10 is $\Delta V_{x2}$ larger than the case where the $\Delta_x$ is 0 (indicated by a dashed line). In addition, since the distance from the side surface 20c of the gear tooth 20a is not measured, the rise of the rectangular shape is steep.

It should be noted that the explanation for the case where the rotation axis 2A of the gear 2 is shifted $\Delta_y$ in parallel in the positive y-direction is omitted as it is similar to the contents shown in FIG. 5C. In addition, the rise of the signal $s_1$ and the fall of the signal $s_2$ are gradual in the same manner as FIG. 11B.

In addition, since the contents about the signals $s_1'$ and $s_2'$ in case of occurrence of the position shift shown in FIG. 6 and that of the axis distortion shown in FIG. 7 are similar, the explanation is omitted.

Effects of the Second Embodiment

According to the above-mentioned second embodiment, since the signs of variations $\Delta V_{x1}'$ and $\Delta V_{x2}'$ in the values of the signals $s_1'$ and $s_2'$ are different due to the occurrence of the axis shift in the x-direction, it is easy to distinguish the case of occurrence of the position shift shown in FIG. 6 from the case of occurrence of the axis distortion shown in FIG. 7.

In addition, this eliminates the necessity of placing the sensors $S_1$ and $S_2$ shown in FIG. 6 above the ends of the bevel gear portion 20. In other words, the case where one of $\Delta V_{z1}$ and $\Delta V_{z2}$ is not rectangular does not occur when the sensors $S_1$ and $S_2$ are not placed above the end portions, however, it is easy to distinguish from the case of FIG. 1 since each sign is identical.

Other Embodiments

It should be noted that the present invention is not intended to be limited to the above-mentioned embodiments, and the various kinds of modifications can be implemented without departing from the gist of the present invention. For example, a gear in a shape having plural combined bevel gears may be used. An internal gear may be used as long as a gear portion is non-parallel to a rotation axis.

What is claimed is:

1. A rotation detector, comprising:
    a first distance sensor disposed to face a body that rotates about an axis with a gear portion formed non-parallel to a rotation axis for continuously measuring a distance from the gear portion during rotation of the rotating body;
    a second distance sensor disposed at a position different from the first distance sensor along a direction parallel to the rotation axis for continuously measuring a distance from the gear portion during rotation of the rotating body; and
    an axis shift detecting portion for detecting an axis shift of the rotation axis based on a variation in the distance measured by at least one of the first and second distance sensors,
    wherein the axis shift detecting portion detects axis shifts along an x-axis, a y-axis and a z-axis as well as angular shifts of the axis of rotation.

2. The rotation detector according to claim 1, wherein the axis shift detecting portion detects the shift of the rotation axis based on an increase, a decrease or a combination thereof in the distance measured by at least one of the first and second distance sensors.

3. The rotation detector according to claim 1, wherein the axis shift detecting portion detects the shift of the rotation axis based on a difference of timing to measure the distance that is measured by at least one of the first and second distance sensors.

4. The rotation detector according to claim 1, further comprising:
    a rotation detecting portion for correcting the distance measured by the first or second distance sensor based on the shift of the rotation axis detected by the axis shift detecting portion and detecting the number of revolutions of the gear portion.

5. The rotation detector according to claim 1, further comprising:
    an abnormal condition detecting portion for detecting an abnormal condition of the rotating body based on the shift of the rotation axis detected by the axis shift detecting portion.

6. A rotation detector, comprising:
    a first distance sensor disposed to face a body that rotates about an axis with a gear portion formed non-parallel to a rotation axis for continuously measuring a distance from the gear portion during rotation of the rotating body;
    a second distance sensor disposed at a position different from the first distance sensor along a direction parallel to the rotation axis for continuously measuring a distance from the gear portion during rotation of the rotating body, and
    an axis shift detecting portion for detecting an axis shift of the rotation axis based on a variation in the distance measured by at least one of the first and second distance sensors,
    wherein the first and second distance sensors are disposed at positions to provide the same argument on an x-y plane centered around the rotation axis.

7. The rotation detector according to claim 6, wherein the first and second distance sensors are disposed directly above end portions of the gear portion in the direction of the rotation axis.

8. The rotation detector according to claim 1, wherein the first and second distance sensors comprise a magnetic or optical distance sensor.

* * * * *